United States Patent [19]

Lybarger

[11] Patent Number: 5,000,386

[45] Date of Patent: Mar. 19, 1991

[54] EXHAUST FLAPS

[75] Inventor: Michael A. Lybarger, Cincinnati, Ohio

[73] Assignee: General Electric Company, N.Y.

[21] Appl. No.: 374,814

[22] Filed: Jul. 3, 1989

[51] Int. Cl.$^5$ .............................................. B64C 9/38
[52] U.S. Cl. ...................... 239/265.39; 239/DIG. 19
[58] Field of Search ...................... 239/265.19, 265.33, 239/265.37, 265.39, DIG. 19; 60/271, 909

[56] References Cited

U.S. PATENT DOCUMENTS

| | | | |
|---|---|---|---|
| 3,889,882 | 6/1975 | Hull, Jr. et al. | 239/127.3 |
| 4,541,567 | 9/1985 | Jourdain et al. | 239/265.37 |
| 4,637,550 | 1/1987 | Nash | 239/265.37 |

OTHER PUBLICATIONS

G.E. Internal Photograph No. 1—Prior to Jun., 1988.
G.E. Internal Photograph No. 2—Prior to Jun. 1988.

*Primary Examiner*—Andres Kashnikow
*Assistant Examiner*—William Grant

[57] ABSTRACT

An exhaust flap for use in the exhaust section of an aircraft gas turbine engine is built with increased service life and ease of replacement. The exhaust flap includes convergent nozzle flaps, divergent nozzle flaps, convergent seal flaps and divergent seal flaps. The exhaust flap comprises a frame assembly with means for mounting in the engine and effecting its movement. The frame assembly is particularly characterized in having an open frame with at least one rail having a receiving channel. A removable baseplate dimensioned to slide into the receiving channels and a retainer means for attachment to the frame assembly to securely hold the baseplate in the frame assembly are also provided. The retainer means is readily removed to permit replacement of the baseplate while the exhaust flap is still mounted in the engine. The removable baseplate prolongs the service life of the exhaust flap due to a decrease in temperature induced stresses. Additionally, maintenance costs are substantially reduced by the ability to readily remove and replace a damaged baseplate.

14 Claims, 4 Drawing Sheets

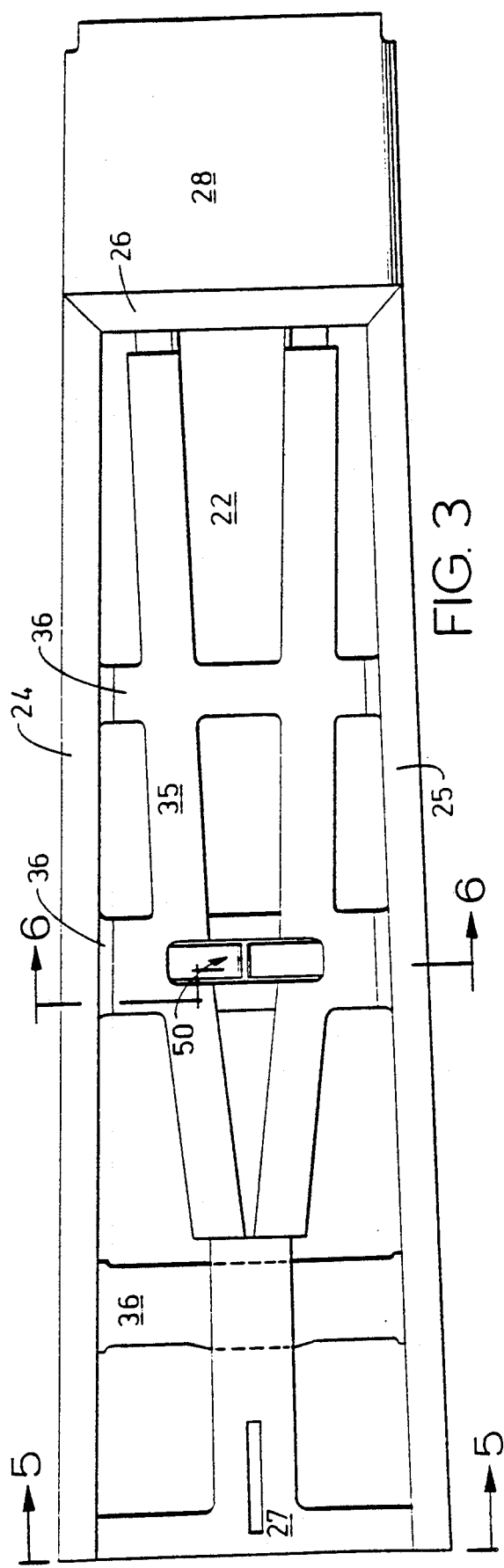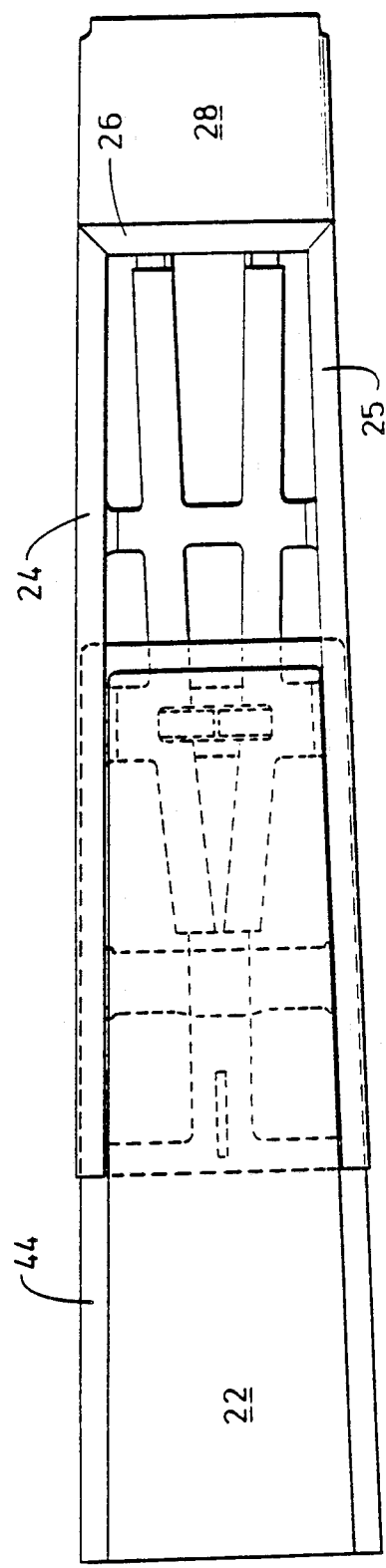

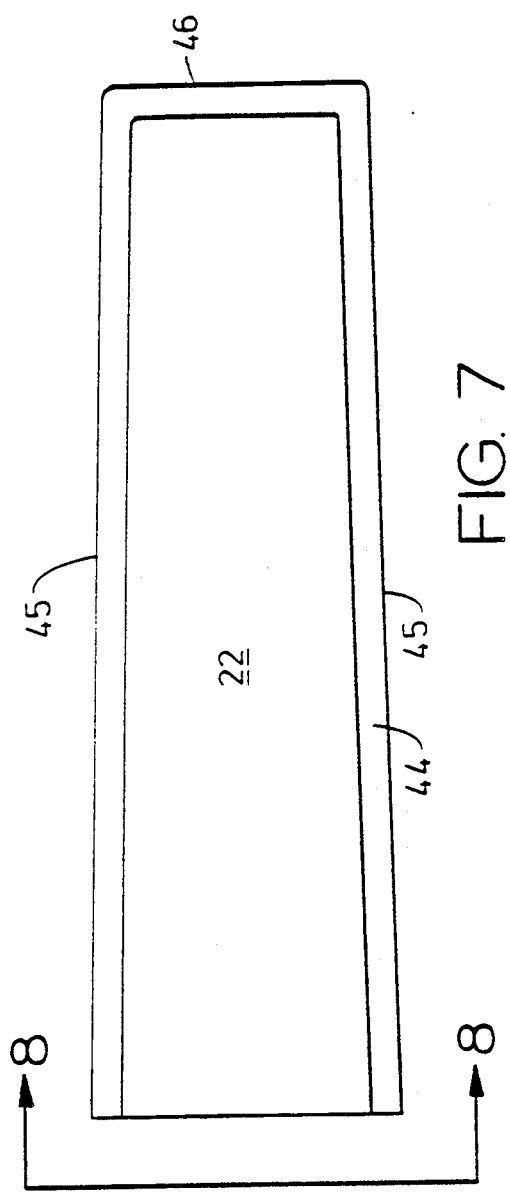
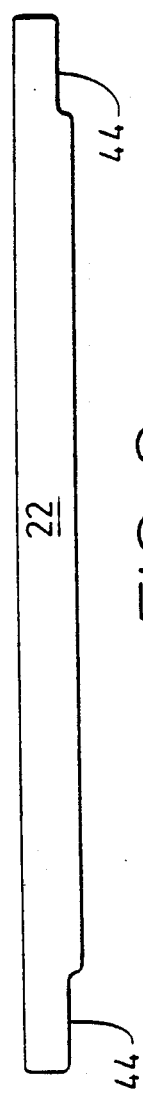
FIG. 7
FIG. 8

EXHAUST FLAPS

The United States Government has rights in this invention pursuant to Contract Number F33615-84C-3225 between the U.S. Air Force and the General Electric Company.

This invention relates to exhaust flaps, including nozzle flaps and seal flaps. More particuarly, this invention relates to exhaust flaps used in the exhaust nozzle section of an aircraft gas turbine engine.

A gas turbine engine produces a reaction thrust by ejecting a high velocity stream of gas from an exhaust nozzle. Air enters an inlet diffuser of the engine and is compressed there and in a rotating compressor. Heat is added by burning fuel in a combustor section. The hot gas expands in the turbine section. Part of the produced energy is extracted to drive the rotating compressor. Further expansion through the exhaust nozzle converts the remaining available energy of the gas stream into a high velocity producing thrust for propulsion power. Thrust developed by the engine can range from a few hundred pounds to many thousand pounds.

Gas turbine engines used in certain military aircraft use a high pressure converging-diverging exhaust nozzle. Thus, the exhaust section of the engine has converging nozzle flaps mounted circumferentially around the exhaust section. These flaps are able to reduce the cross-section area through which exhaust gas flows. The narrowest cross-section area formed by the flaps is the throat. Mounted immediately after the converging nozzle flaps in a similar manner and hinged thereto are diverging nozzle flaps. These flaps increase the exit area through which the exhaust gases flow. At idle and cruise speeds, the nozzle flaps are set to maximize fuel efficiency. However, for take-offs and accelerated flight when maximum thrust is needed, the nozzle flaps are set to provide the converging-diverging gas flow passage. The dimensions of the throat and exit flow passage areas are varied to match the flow and expansion requirements of varying flight speeds and altitudes experienced on a routine basis by the aircraft.

The nozzle flaps used in the engines of aircraft are sets of individual, though operably connected flaps. There are convergent nozzle flaps and divergent nozzle flaps. Each type of nozzle flap is individually mounted around the inside circumference of the exhaust section of the engine. The flaps are generally rectangular in shape and are about three to six inches wide. The flaps are mounted so that they move about pivot points toward or away from a center line extending the length of the engine. Each set of flaps spreads out in a fan-like manner during movement. Seal flaps, which are similar in construction to the nozzle flaps, typically are positioned between adjacent nozzle flaps. The seal flaps are mounted to move laterally relative to the nozzle flaps. The exhaust flaps comprised of the nozzle flaps and seal flaps collectively present a continuous interior surface which directs gas flow in a desired manner. All the exhaust flaps are operably connected to simultaneously move together in response to an actuator.

Known nozzle flaps and seal flaps have a one piece unitary structure where all components are welded together. The generally rectangular-shaped bottom portion of each flap faces inwardly and, as such, is directly exposed to the engine's exhaust gas. Temperatures of up to about 1200° C. are common. The back portion of the flap is also subjected to high temperature, though considerably less, e.g. up to about 400° C.

Nozzle and seal flaps periodically must be replaced. Typically, the flattened bottom portion of the flap exposed to the highest temperature becomes damaged. The extreme transient and steady state temperature cycles experienced by the flaps during use are often responsible for thermal stresses in the bottom portion and ultimate cracking results. Repair of the flaps involves a substantial down time and costly replacement part. In effect, a complete nozzle flap or seal flap must be disconnected from its linkages and attachment points and then a complete replacement flap installed.

In accord with a demonstrated need, there has been developed exhaust flaps for use in gas turbine engines which improve upon that previously used. The flaps have increased service life and reduced maintenance time when replaced.

SUMMARY OF THE INVENTION

An exhaust flap for mounting in a gas turbine engine comprises an elongated frame assembly, a baseplate and a retainer means. The frame assembly is generally rectangular-shaped with an open bottom. At least one rail of the frame assembly has a channel to receive the baseplate. The baseplate is dimensioned to slide into the receiving channel to substantially cover the bottom of the flap and form a solid bottom surface. The retainer means attached to the frame assembly securely holds the baseplate in position, yet is readily removed to permit replacement of the baseplate. The exhaust flap has an extended service life due to a reduction in thermal stresses it must endure. Additionally, maintenance time involved in replacing a damaged flap is substantially reduced when any damage is in the baseplate. The baseplate of the flap is readily removed while the exhaust flap remains in the engine merely by removal of the retainer means and replacement of a damaged baseplate by a new baseplate. Complete demounting of the total flap from the engine is avoided.

BRIEF DESCRIPTION OF THE DRAWINGS

FIG. 3 is a top view of a frame assembly of the nozzle flap of FIG. 2.

FIG. 4 is a bottom view of the nozzle flap of FIG. 2 showing a baseplate partially removed from the frame assembly.

FIG. 7 is a bottom view of the baseplate used in the nozzle flap of FIG. 2 showing recessed edges along three sides.

FIG. 8 is an end view of the baseplate of FIG. 7.

DETAILED DESCRIPTION OF THE INVENTION

Figure 1:
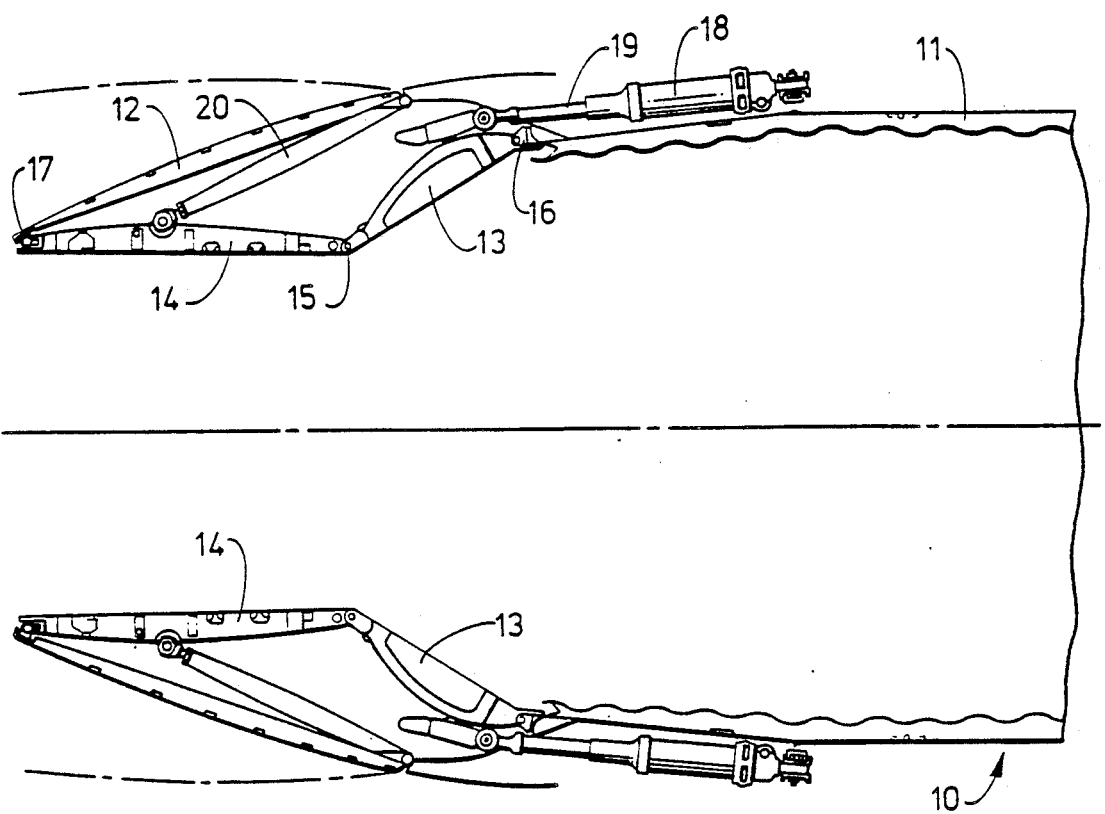
FIG. 1 is a partial cross-sectional view of a portion of the aft end of a gas turbine engine with the exhaust flaps of this invention mounted therein.
Figure 2:
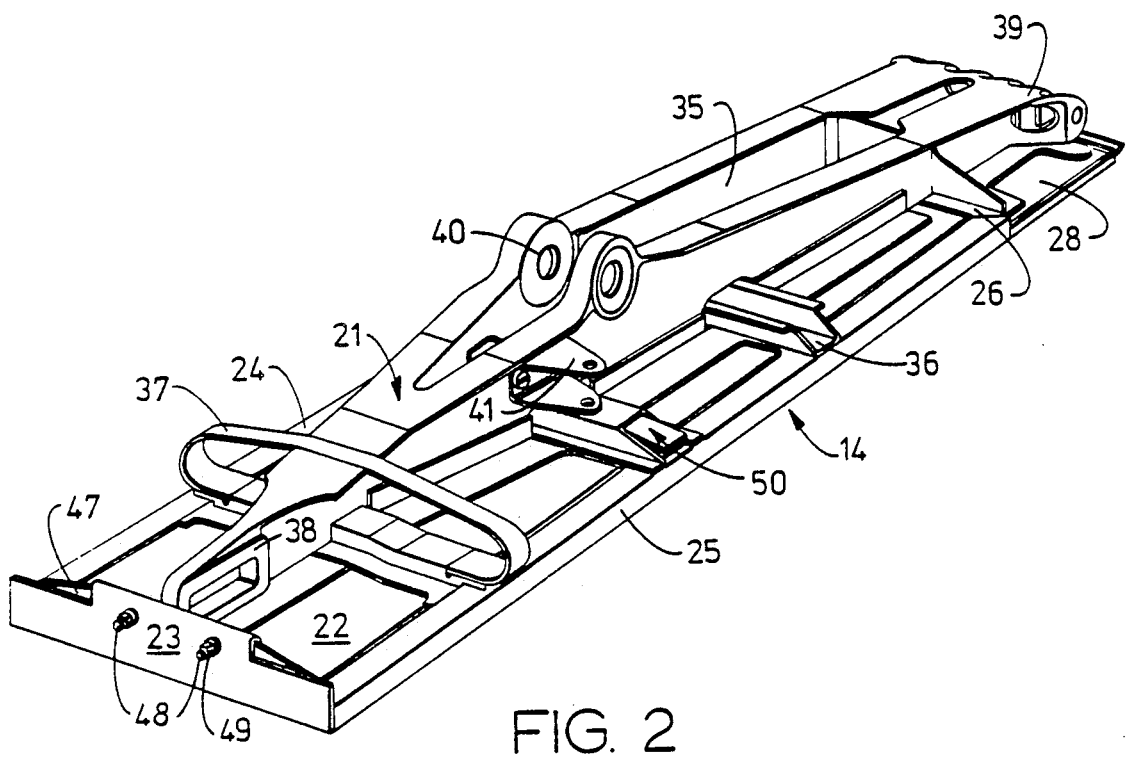
FIG. 2 is a perspective view of a nozzle flap of this invention.
Figure 5:
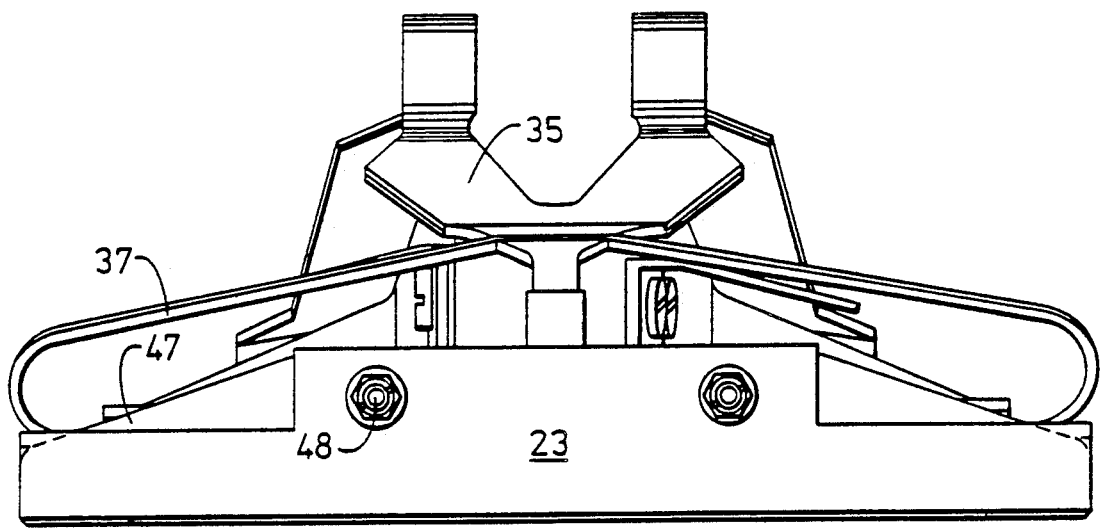
FIG. 5 is an end view of the nozzle flap of FIG. 3.

The exhaust flaps of the invention include convergent and divergent nozzle flaps and convergent and divergent seal flaps. For illustration purposes a divergent nozzle flap is described with particularity below and in the drawings. It should be understood that only changes of a routine nature are needed to form the convergent nozzle flaps, convergent seal flaps and divergent seal flaps.

With reference to FIG. 1 there is shown the aft portion of a gas turbine engine 10. Exterior cowling 11 and outer cover 12 are conventional in design. Sets of convergent nozzle flaps 13 and divergent nozzle flaps 14 are mounted in the exhaust section of the nozzle. An axisymmetric nozzle system is formed. The flaps are held together by hinge 15. Each convergent nozzle flap is pivotally attached to cowling 11 by hinge 16. Each divergent nozzle flap is pivotally attached to an outer cover 12 by hinge 17. An actuator 18 and actuator rod 19 are operably connected to the convergent nozzle flaps to effect movement of the flaps in unison. This movement causes the convergent flaps to pivot about hinge 16 thereby moving towards or away from the exhaust section's center line. The divergent nozzle flaps 14 follow the movement of the convergent nozzle flaps. Additionally, convergent seal flaps (not shown) interleaved between adjacent convergent nozzle flaps and divergent seal flaps (not shown) interleaved between adjacent divergent nozzle flaps move laterally in response to the nozzle flaps' movement. Compression linkage arms 20 connected to the divergent nozzle flaps and cowling 11 provide stability.

Different types of known actuators can be used. As shown, actuator 18 is a linear hydraulic actuator where hydraulic fluid is supplied under pressure through conduits from a control source. Other actuators of the screw-jack type driven by rotating motion from a motor can be used. While not apparent in the drawings, a unison collar extending around the outer surfaces of the convergent flaps is operably connected to the actuators 18. In this manner, the actuators are simultaneously operated in the same degree. This causes the convergent and divergent nozzle flaps to open and close in synchronization. The result being that the nozzle area through which exhaust gases flow to produce thrust is thus changed in a controlled manner depending on the power needs of the engine.

The basic operation of the exhaust flaps of the invention as described above is the same as with conventional exhaust flaps. In accord with this invention and as shown in FIGS. 2-8, the exhaust flaps are constructed in a manner which extends their service life and reduces maintenance time when their replacement is required. The description to follow is with respect to a divergent nozzle flap. The invention applies as well to convergent nozzle flaps with necessary dimensional changes of a routine nature needed. The invention applies as well to convergent and divergent seal flaps as can be appreciated by those skilled in the art.

Divergent nozzle flap 14 is comprised of an elongated frame assembly 21, baseplate 22 and retainer means 23. Frame assembly 21 is typically made of a high temperature resistant metal alloy with the individual parts welded together to form a unitary structure. The assembly has an open frame comprised of side rails 24 and 25, forward rail 26 and end rail 27. The open frame is generally rectangular in shape and somewhat tapered toward forward rail 26. The open frame's outside dimensions range from about three to six inches wide and ten to thirty inches long, depending on the engine's configuration in which it is mounted. The taper of the open frame works in conjunction with the seal flaps and is to accommodate the fan-like movement of the flaps during operation. The forward rail can represent the extremity of the open frame or, as shown, a bottom plate 28 can extend from forward rail 26. Plate 28 is used to add strength to the assembly and can be utilized in the invention since it is exposed to a lower temperature than the baseplate 22 as explained below.

Figure 6:
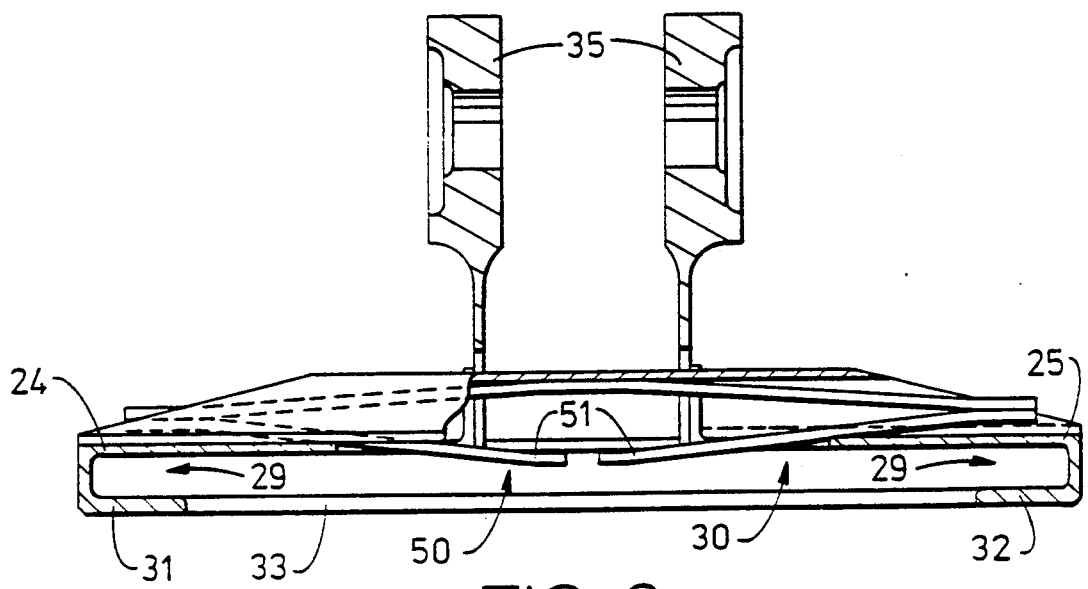
FIG. 6 is a sectional view of the nozzle flap of FIG. 2 taken along line 6—6 of FIG. 3 with the baseplate removed to show a dampening spring.

At least one rail of the open frame has a receiving channel. Preferably, and as best seen in FIG. 6, side rails 24 and 25 of the open frame each have a receiving channel 29 on an underside. Right angle flanges 31 and 32 extend inwardly from each of the rails to form slots through which the baseplate 22 slides and is supported, properly positioned for use. Preferably, forward rail 26 also has a right angle flange 33 and receiving channel 30 on an underside to accommodate the forward end of the baseplate. FIG. 4, showing the baseplate 22 partially removed from the frame assembly, is used to illustrate the manner in which the baseplate moves during assembly.

Frame assembly 21 has a superstructure welded to the open frame for strengthening and engine mounting purposes. With reference still to FIGS. 2-6 there is shown a dual sided backbone flange 35 extending substantially the length of the open frame and attached thereto at its ends and at intermediate points by lateral stiffener channels 36 and seal loop retainer 37. The stiffener channels and loop retainer extend essentially at right angles to the dual sided backbone and are welded to side rails 24 and 25. Cut-aways are made in the backbone 35 to accommodate the stiffener channels and loop retainer. Each flap is mounted in the exhaust nozzle section of an engine by attachment means used in conjunction with outer flap lug 38, flap hinge lugs 39 and compression linkage lug 40. Opening and closing the flap is mechanically effected through the linkages indirectly connected with actuator 18. The divergent flap of FIGS. 2-6 is pivotally connected with a convergent flap at hinge lugs 39 with a hinge pin. A seal bracket 41 is provided on each side of backbone flange 35 for attaching a seal flap (not shown).

The baseplate 22 used in the frame assembly 21 is generally rectangular-shaped and is dimensioned to slide into the channels of the rails 24, 25 and 26 to cover the open frame's bottom surface. It thus approximates the length and width of the open frame of the elongated frame assembly. As evident from FIGS. 7 and 8, the baseplate has a thickness slightly less than the channels' height so as to allow it to freely slide therein. Preferably, a recessed edge area 44 at each side edge 45 and forward edge 46 is provided. The depth of the recess approximates the thickness of right angle flanges 31, 32 and 33. The width of the recess approximates the distance that the flanges extend inwardly from the outer edge of each rail. The purpose of the recess as dimensioned is to aid in assembly and most importantly provides a substantially flat bottom surface to the flap with the surfaces of the rails and baseplate flush with one another.

Baseplate 22 can be made of the same metal as that of the frame assembly. It has been found that the service life of such a flap exceeds a flap wherein the baseplate and frame assembly are also made of the same material, though are unitary in structure. It is theorized the two piece structure by its very nature has relief points which relieve the thermal stresses induced by the temperature extremes experienced during use. Thus, less stress fractures are found in the baseplate of the present flap. The open frame rails themselves are not affected so much by the extreme temperature because of the fact they are shielded by the overlapping seal flaps.

The baseplate can also be made from a high temperature resistant material. For example, a coated carbon-carbon or ceramic matrix composite material can be used to fabricate the baseplate. Such materials, which are commercially available, are very resistant to high temperatures. However, they are difficult to bend or weld and as such are not suitable materials of construction for flap parts such as the backbone, stiffener channels, etc. The two piece nature of the exhaust flap of this invention, however, allows each part to be made of a material which best serves that part's physical parameter needs. A secondary benefit possible with the exhaust flaps of the invention is the latitude to fabricate a removable baseplate from a "low observance" quality material. Such materials are known with their function being to absorb radar waves to avoid detection by radar.

A third component of the nozzle flap is a means for retaining baseplate 22 in position during use. Retainer means 23 is a U-shaped clip with a length approximating the width of end rail 27 with each leg sufficiently long to extend over a vertical flange 47 on the end rail and cover the back edge of the baseplate. When properly positioned the clip locks the baseplate into the open-frame. The retainer means preferably includes bolts 48 extending through the clip and end rail flange 47 and nuts 49 to secure it to the frame assembly. Retainer means of other configurations can as well be used. For example, the baseplate could have a hole positioned in it near one end such that a removable bolt acting as a retainer means protrudingly engages flange 47 of end rail 27. This engagement is sufficient to retain the baseplate in the frame assembly. Still other alternative means to achieve the same retaining function are possible.

A preferred embodiment of the invention utilizes a dampening spring in the frame assembly to alleviate vibrations in the baseplate during operation. With reference to FIGS. 3 and 6 a stiffener channel 36 has a dampener spring 50 comprised of two metal tabs 51 extending towards one another from opposite sides of the stiffener channel. The tabs 51 are angled toward the underside of the baseplate so as to make contact with it. Vibrations from the baseplate are transferred to the metal tabs which tend to absorb them.

The nozzle flaps are accessible when positioned in the exhaust nozzle section of a gas turbine engine of an aircraft. Particularly, retainer means on the divergent and convergent nozzle flaps are readily removed. This allows a baseplate to slide in the channels of the side rails until fully removed from the frame assembly. A replacement baseplate is just as easily installed by sliding it along the channels until fully in position. The retainer means is put back into place and secured to the frame assembly by the bolts and nuts.

The advantages flowing from the above described invention as described with particular reference to the drawings should be apparent. Baseplates in exhaust flaps receive the greatest temperature exposure and tend to suffer damage before any other part of the flap. In accord with this invention, any damaged baseplate is readily replaced without having to remove the total nozzle flap. Rather, the retainer means is removed, the damaged baseplate removed and a new baseplate installed. There is no need to disengage the various flap linkages and mounting attachments. This means there is a substantial savings in maintenance costs by this time saving feature. Additionally, only a part of the flap need be replaced. This means a substantial savings in replacement part costs. The above noted advantages are to be contrasted with known one piece nozzle flaps where structural damage in the baseplate means a complete nozzle flap replacement.

Still further, use of the two piece flap construction of the invention means there are relief points which translate into longer service life of each flap. A preferred baseplate of coated carbon-carbon material or ceramic matrix composite material permits even longer service life of the flap simply because of the higher temperature resistance of each of these materials than the normally used metal alloy. Also, the use of such preferred baseplates permits engine growth potential.

The divergent nozzle flap described in particularity with reference to the drawings represent a preferred embodiment. It will be understood by those skilled in the art that modifications and changes of an obvious nature can be made and that the invention applies to any exhaust flap including convergent and divergent nozzle flaps and convergent and divergent seal flaps. The appended claims are intended to cover all such modifications and changes.

What is claimed is:

1. An exhaust flap for mounting in an exhaust nozzle section of a gas turbine engine, said exhaust flap comprising:
    (a) an elongated frame assembly having mounting means for attachment to the engine, said frame assembly characterized in having an open frame with at least one rail with a receiving channel;
    (b) a removable baseplate dimensioned to slide into the receiving channel of the frame assembly to form a solid bottom surface to the flap, said baseplate being substantially the length and width of the open frame; and
    (c) a retainer means for retaining the baseplate within the frame assembly, said retainer means being removable to permit replacement of the baseplate while the assembly is mounted in the gas turbine engine.

2. The exhaust flap of claim 1 wherein the frame assembly is comprised of a generally rectangular open frame having two side rails which have a receiving channel, a forward rail and an end rail, with a backbone extending substantially the length of the open frame and with structural ribs extending laterally from the backbone to the open frame for strengthening purposes.

3. The exhaust flap of claim 2 wherein the frame assembly is further characterized in having a receiving channel in the forward rail of the open frame, said forward rail receiving channel interconnected with the side rail receiving channels such that the baseplate is slidable into the open frame and supported in said forward and side channels.

4. The exhaust flap of claim 3 wherein the retainer means includes a U-shaped clip which fits over a flange extending from the end rail of the open frame and covers a rear edge of the baseplate and further includes bolt attachment means for holding the U-shaped clip to the frame assembly.

5. The exhaust flap of claim 3 wherein the frame assembly further comprises a dampening spring positioned on the frame assembly to contact an underside of the baseplate.

6. The exhaust flap of claim 3 wherein the baseplate comprises a high temperature resistant metal alloy.

7. The exhaust flap of claim 3 wherein the baseplate comprises a high temperature resistant coated carbon-carbon material.

8. The exhaust flap of claim 3 wherein the baseplate comprises a high temperature resistant ceramic matrix composite material.

9. The exhaust flap of claim 3 wherein the baseplate has recessed side edges so that when slid into the receiving channels of the frame assembly the flap has a substantially flat bottom surface with the surfaces of the rails and baseplate flush with one another.

10. The exhaust flap of claim 9 further wherein the baseplate has a recessed forward edge.

11. The exhaust flap of claim 3 wherein the exhaust flap is a divergent nozzle flap.

12. The exhaust flap of claim 3 wherein the exhaust flap is a convergent nozzle flap.

13. The exhaust flap of claim 1 wherein the exhaust flap is a divergent seal flap.

14. The exhaust flap of claim 1 wherein the exhaust flap is a convergent seal flap.

* * * * *